United States Patent [19]

Rogers et al.

[11] 4,079,208

[45] Mar. 14, 1978

[54] TELECOMMUNICATIONS TRANSMISSION AND SIGNALLING CIRCUITS

[75] Inventors: Alastair Stanley Rogers; Norman Thorogood Thurlow, both of Ipswich, England

[73] Assignee: The Post Office, London, England

[21] Appl. No.: 744,390

[22] Filed: Nov. 23, 1976

[30] Foreign Application Priority Data

Nov. 26, 1975 United Kingdom .............. 48692/75

[51] Int. Cl.² ......................... H04M 3/22; H04B 3/46
[52] U.S. Cl. .............................................. 179/18 FA
[58] Field of Search .............. 179/18 F, 18 FA, 84 R, 179/84 A, 18 HB, 81 R

[56] References Cited

U.S. PATENT DOCUMENTS

| 3,622,709 | 11/1971 | Tjaden ............................ 179/18 FA |
| 4,020,294 | 4/1977 | Kitajewski et al. .............. 179/18 FA |

FOREIGN PATENT DOCUMENTS

| 1,201,093 | 5/1970 | United Kingdom ............ 179/18 FA |
| 1,274,957 | 5/1972 | United Kingdom ............ 179/18 FA |

Primary Examiner—Thomas A. Robinson
Attorney, Agent, or Firm—Kemon & Estabrook

[57] ABSTRACT

A d.c. signal detector circuit for a telephone exchange which comprises a level detector which is so connected that it can sense current flowing in a telephone line. The level detector is arranged to switch states when a loop is established in a telephone circuit. Two level detectors can be employed to sense the establishment of a loop, a coin pulse, or an earth loop.

9 Claims, 11 Drawing Figures

TELECOMMUNICATIONS TRANSMISSION AND SIGNALLING CIRCUITS

This invention relates to a d.c. signal detector for a telephone exchange. The detector is designed for use with an electronic current feed circuit of the type described in Ser. No. 740,087, filed Nov. 9, 1976, by the applicants herein.

A supervisory unit of a telephone exchange has to perform a number of functions. It provides a transmission bridge which allows a.c. speech signals to pass between two subscribers and separates out d.c. signals, it provides current for the transmitter and signalling devices and it also provides detectors to respond to various signals originating from a subscriber's telephone. A transmission bridge having an electronic current feed circuit is described in the aforementioned application. The current feed circuit employs simulated inductances consisting of electronic components and thus enables the transmission bridge to be made smaller than conventional transmission bridges.

The present invention provides a d.c. signal detector which is designed for use with the current feed circuit of the aforementioned application.

According to the present invention there is provided a d.c. signal detector circuit for a telephone exchange comprising a level detector having a first input which is arranged to be connected to a point from which it can detect current flowing in a telephone line and a second input which is arranged to have a reference signal applied thereto, the level detector having two states and being arranged to change states when the signal at its first input is indicative of the telephone line having a predetermined resistance, the output signal of the level detector being indicative of the state of the line. The level detector may be an operational amplifier which is connected as a comparator. The reference signal may be so selected that the detector circuit detects the establishment of a loop in the telephone circuit. The first input may be connected to one of a pair of telephone lines and the second input is connected to the other of said pair of lines.

The detector circuit may have two level detectors, the first detector having a first input which is arranged to be connected to a first point from which it can detect current flowing in one of a pair of telephone lines and a second input which is arranged to have a reference signal applied thereto, the second detector having a first input which is arranged to be connected to a second point from which it can detect current flowing in the other of said pair of lines and a second input which is arranged to have a reference signal applied thereto, each level detector having two states and being arranged to change state when the signal at its first input is indicative of the telephone line having a respective one of two predetermined resistances, the output signals of the level detectors together being indicative of the state of the line. Each level detector may be an operational amplifier which is connected as a comparator. The first input of the second detector may be connected to said second point by a transistor which acts as an inverter.

The detector circuit may include a decoding arrangement connected to the outputs of the level detectors. The decoding arrangement may comprise three NAND gates.

The reference signals may be so selected that the detector circuit can detect the establishment of a loop in the telephone circuit, a coin pulse and an earth loop.

The first input of the second comparator may be connected to the second input of the first comparator by a diode, and the second input of the first comparator may be connected to the first input thereof by another diode.

A resistor and capacitor network may be connected in the input circuit of the comparators to reduce common mode interference.

The invention will be described now by way of example only with particular reference to the accompanying drawings. In the drawings.

The present detector circuit is designed for use with the current feed circuit described in U.S. Ser. No. 740,087 filed Nov. 9, 1976. Before describing the detector circuit a description of the current feed circuit will be given.

Figure 1:
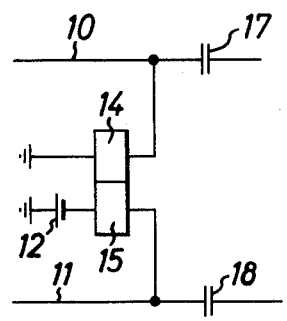
FIG. 1 shows one form of known transmission bridge used in telephone exchanges.
Figure 2:
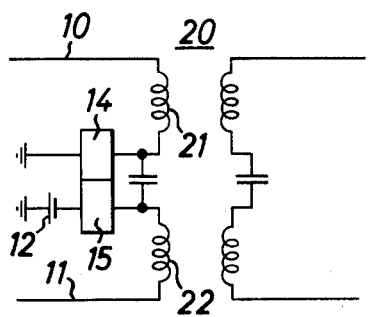
FIG. 2 shows another known form of transmission bridge which is used in telephone exchanges.

FIGS. 1 and 2 each show a known form of transmission bridge used in telephone exchanges. The form shown in FIG. 1 is a capacitor transmission bridge. The bridge is connected to a subscriber's telephone by lines 10 and 11. Current feed to a subscriber's telephone is from a battery 12 which is connected to the lines 10 and 11 by way of relay coils 14, 15. Capacitors 17, 18 connected in the lines 10, 11 isolate direct current signals flowing on one side of the exchange from those on the other side. The impedance of the relay coils are sufficient to minimise the shunting effect of the battery on the line. Typically the resistance of the current feed is 200Ω in each leg to maintain the line current within suitable limits for different lengths of line.

The form of bridge shown in FIG. 2 is a transformer transmission bridge. In this case d.c. isolation is performed by a transformer 20. Current feed is again from a battery 12 by way of relay coils 14, 15 and the coils 21, 22 of the transformer primary. In this bridge the high impedance current feed is provided by the coils 21, 22. The transformer bridge has a major advantage over the capacitor bridge in that it rejects longitudinal or common mode interference thereby reducing the possibility of the build-up over a number of links of very large longitudinal voltages which could affect the transmission and signalling performance. This advantage makes the use of a transformer bridge preferable in many cases even though it is larger and more expensive than a capacitor bridge.

Both of the above known transmission bridge circuits are rather bulky particularly when compared with the electronic circuits.

Figure 3:
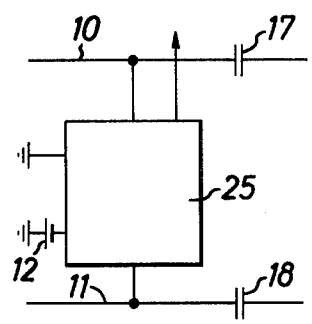
FIG. 3 illustrates schematically a transmission bridge employing a current feed circuit described in our prior application Serial No. 740,087, filed Nov. 9, 1976.
Figure 4:
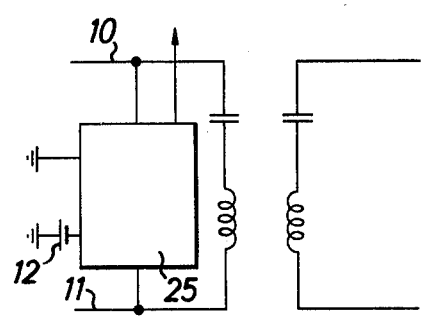
FIG. 4 shows another type of transmission bridge employing a current feed circuit described in our prior application Serial No. 740,087, filed Nov. 9, 1976.
Figure 6:
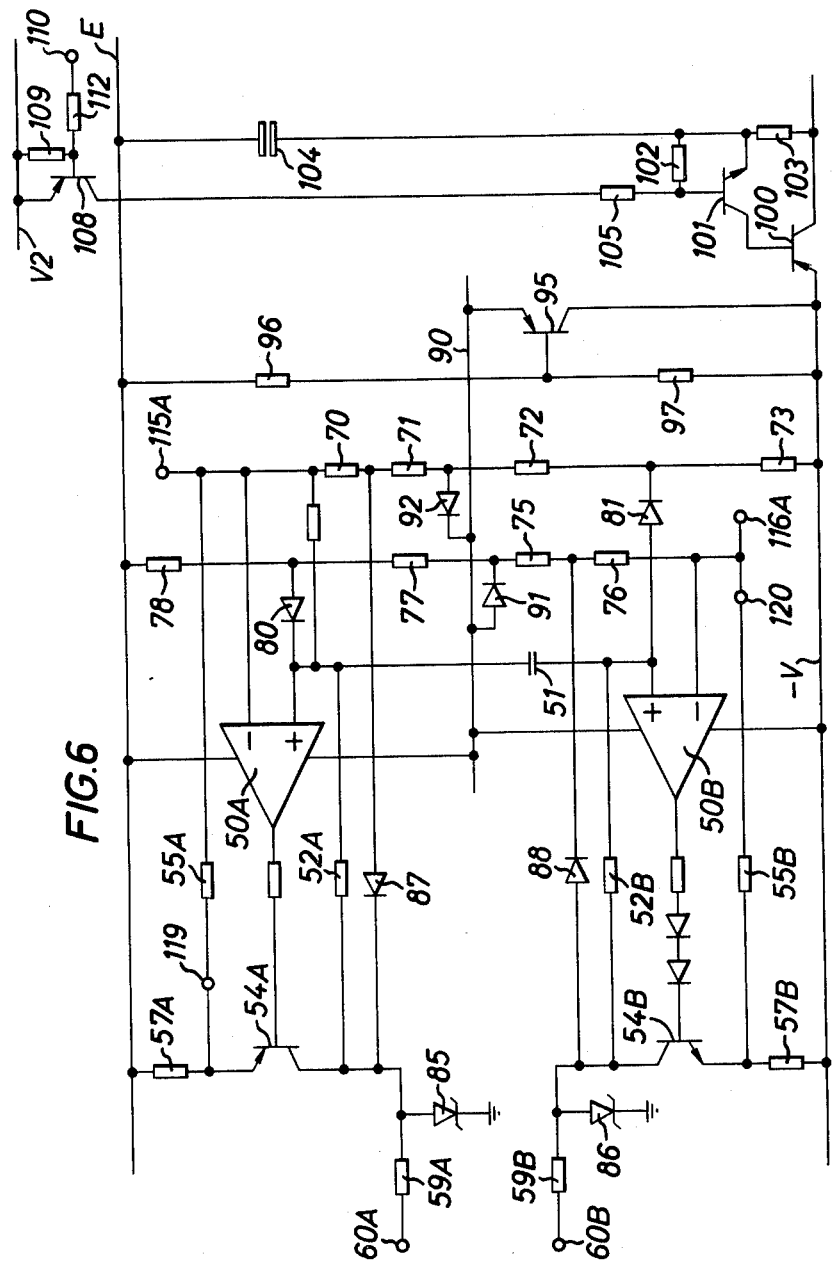
FIG. 6 is a circuit diagram of a current feed circuit described in U.S. application 740,087, filed Nov. 9, 1976.

FIGS. 3 and 4 show respectively a capacitor bridge and a transformer bridge provided with a current feed circuit 25 which employs electronic components. The transformer version of such a transmission bridge can be made relatively small if a parallel line current feed circuit is provided so that no d.c. current flows in the transformer windings which are designed purely for their a.c. characteristics. A parallel line current feed circuit needs to be of low resistance and high a.c. impedance which means employing inductors which provide inductances as large as those provided in known transformer bridges. Large value inductances can be simulated using electronic components and a current feed circuit which uses simulated inductances is shown in FIG. 6. This circuit supplies a direct current through a low resistance but can be connected across the transmission line without any appreciable transmission loss. It can also be used in a capacitor type transmission bridge.

Before describing the circuit of FIG. 6 reference will be made to FIG. 5 which shows the basic simulated inductance used in the circuit of FIG. 6. The simulated inductance comprises an operational amplifier 50, the non-inverting input of which is connected by a capacitor 51 to earth line E and by a resistor 52 to the collector of a transistor 54. The inverting input of the amplifier 50 is connected to the junction of two resistors 55 and 56 which are connected in series with a further resistor 57 between earth line E and supply line -V. The output of the operational amplifier 50 is connected to the base of the transistor 54 and the emitter of the transistor 54 is connected to the junction of the resistors 55 and 57. The collector of the transistor 54 is connected by a resistor 59 to a terminal 60.

Under steady state conditions the inverting input to the operational amplifier 50 is maintained at approximately two volts below the voltage at the emitter of the transistor 54 by the resistor chain 56, 55, 57. The non-inverting input of the amplifier is at substantially the same voltage as the collector of the transistor 54, the current in the resistor 52 being negligible. Since the amplifier 50 operates to equalise the voltages on its two inputs the collector voltage of the transistor 54 will always be maintained at substantially two volts below its emitter voltage. When the resistor 57 has a resistance of 30Ω and the resistor 59 a resistance of 120Ω the d.c. characteristics of the circuit of FIG. 5 are defined as a resistance of 150Ω in series with a constant two volts.

Figure 5:
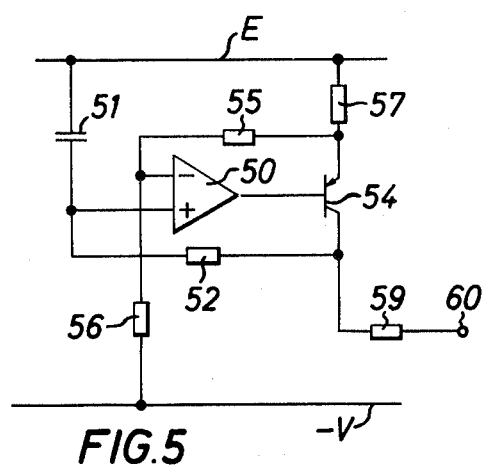
FIG. 5 is a circuit diagram of a simulated inductance circuit used in a current feed circuit described in our prior application Serial No. 740,087, filed Nov. 9, 1976.

The a.c. characteristics of the circuit of FIG. 5 can be best understood by considering the application of a voltage step V1 between the terminal 60 and earth line E. When such a voltage step is applied the current through resistor 59 does not change instantaneously because the capacitor 51 prevents the voltage at the inputs of the operational amplifier 50 from changing. The capacitor 51 begins to charge slowly through the resistor 52 at an initial rate of $V1/C51 \times R52$ volts per second where C51 is the capacitance of the capacitor 51 and R52 is the resistance of the resistor 52. The voltage at the emitter of the transistor 54 changes at the same rate so that the current through resistor 59 starts to change at a rate of $V1/C51 \times R52 \times R57$ amps per second where R57 is the resistance of the resistor 57. Thus the circuit shown in FIG. 5 appears as an inductance of $C51 \times R52 \times R57$ Henries connected between the terminal 60 and earth line E.

Referring now to FIG. 6 the current feed circuit employs two of the circuits of FIG. 5 connected in a balanced configuration. Components corresponding to those of FIG. 5 are shown by like reference numerals, the components of the two simulated inductances being distinguished by the references A and B. A common capacitor 51 is employed for the two simulated inductance circuits to provide an improved balance. In the case of the simulated inductance having the operational amplifier 50A the resistor 56 is constituted by two resistors 70 and 71 which form part of a resistance chain 70, 71, 72 and 73 connected between supply line V and resistor 55A. In the case of the simulated inductance having the amplifier 50B the resistor 56 is constituted by two resistors 75 and 76 which form part of a resistance chain 75, 76, 77 and 78 connected between earth line E and the resistor 55B. A diode 80 is connected between the non-inverting input of the amplifier 50A and the junction of resistor 77 and 78 and a diode 81 is connected between the non-inverting input of the amplifier 50B and the junction of resistors 72 and 73. A diode 87 is connected between the collector of the transistor 54A and the junction of the resistors 70 and 71 and a diode 88 is connected between the collector of the transistor 54B and V junction of the resistors 75 and 76.

Each simulated inductance circuit has a zener diode 85, 86 which is connected between earth and the collector of the transistor 54A, 54B.

A line 90 is maintained at a potential of substantially V/2 by connection to the emitter of a transistor 95 and is used as a voltage reference for diodes 91 and 92 whose purpose is to define the overload characteristics of the circuits. The diodes 91 and 92 are connected respectively to the junction of the resistors 75 and 77 and the junction of the resistors 71 and 72. The collector of the transistor 95 is connected to line V. The base of the transistor 95 is connected to the junction of two resistors 96, 97 which are connected in series between earth line E and supply line V.

Stabilisation for the power supply to the circuit is provided by an arrangement consisting of transistors 100 and 101, resistors 102 and 103 and a capacitor 104. The junction of the resistor 102 and the base of the transistor 101 is connected by a resistor 105 to the collector of a transistor 108 the emitter of which is connected to a supply line V2. The base of the transistor 108 is connected to a supply line V2 by a resistor 109 and to a terminal 110 by a resistor 112.

The current feed circuit of FIG. 6 is connected to form a transmission bridge by connecting the terminal 60A to the line 10 of FIG. 3 or FIG. 4 and the terminal 60B to the line 11 of FIG. 3 or FIG. 4. Such an arrangement acts as a current feed for a subscriber's telephone and also acts as an impedance for a.c. speech signals transmitted to the exchange. By appropriately selecting the values of resistors 57A, 59A and 57B, 59B each part of the current feed circuit can be made to behave as 150Ω in series with the constant two volts. The circuit can then provide a suitable transmitter current which is within the required limits for all lengths of line normally used. The current feed characteristic of the circuit of FIG. 6 is very similar to that of existing feed circuits.

When a.c. speech signals are transmitted along lines 10, 11 there is a relative voltage change between the collectors of the transistors 54A and 54B so that the capacitor 51 charges and discharges in a similar manner to a single circuit. However, under longitudinal, i.e. common mode noise, signals there is no relative voltage change between the collector of the transistors 54A and 54B and the complete circuit behaves as a 150Ω resistor connected between each line and earth. This provides considerable attenuation to longitudinal hum and noise voltages allowing the circuit to operate on lines subject to such interference.

Figure 7:
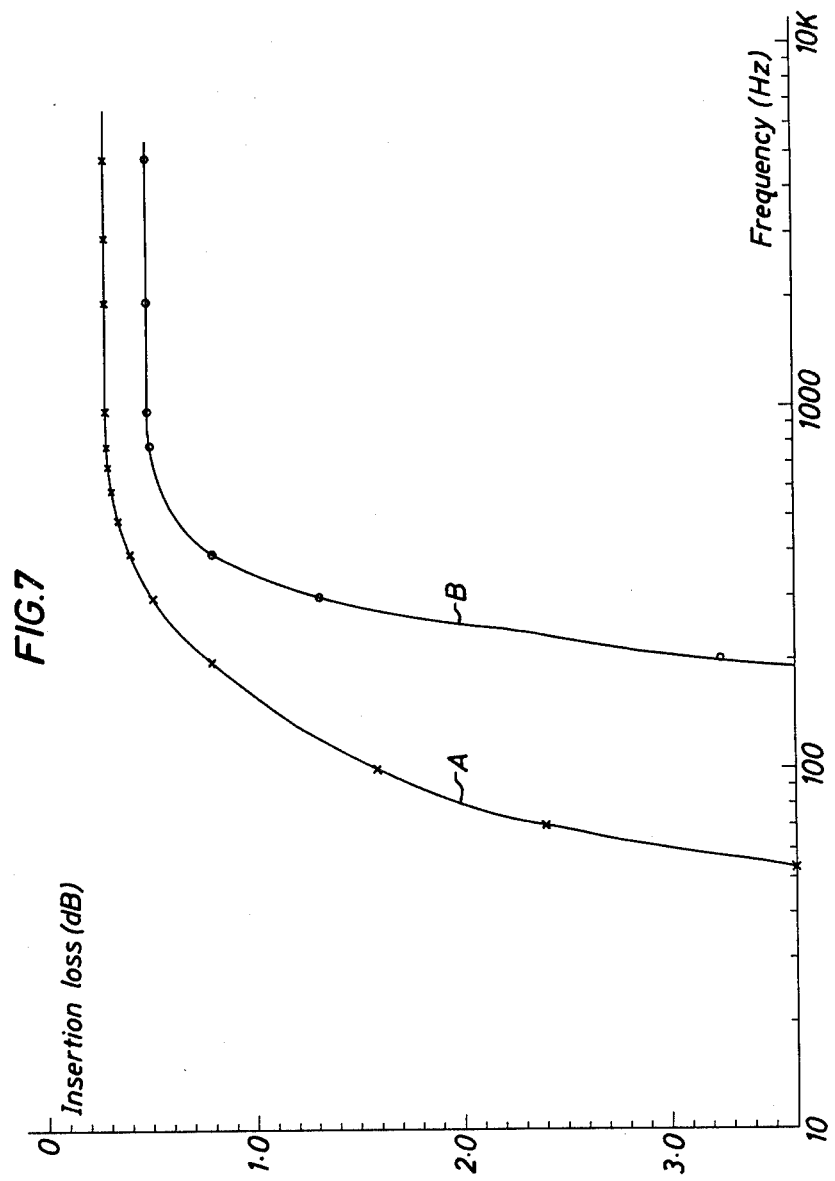
FIG. 7 is a plot which compares the insertion loss of a transformer bridge provided with the current feed circuit of FIG. 6 with the insertion loss of a conventional transformer bridge.
Figure 8:
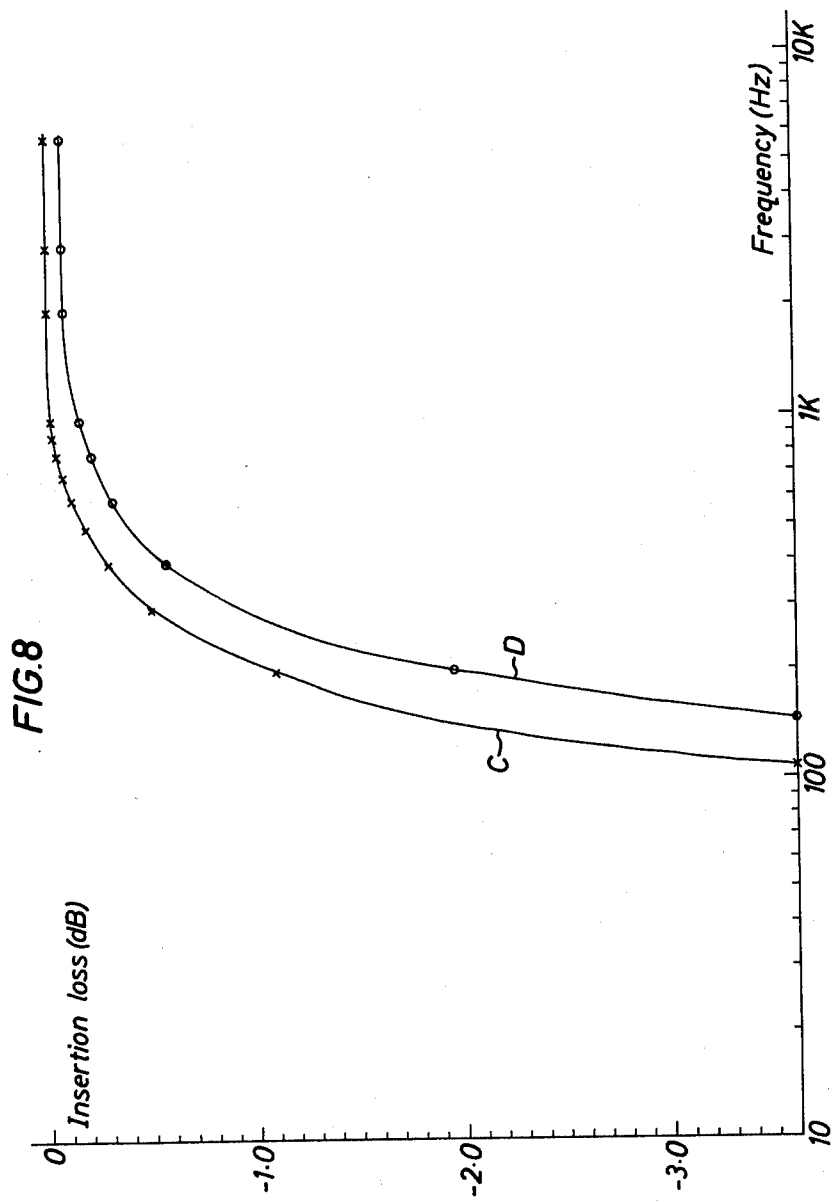
FIG. 8 is a plot which compares the insertion loss of a capacitor bridge provided with the current feed circuit of FIG. 6 with the insertion loss of a conventional capacitor bridge.

The impedance presented by the circuit of FIG. 6 to transverse speech signals is equivalent to about 2.5 Henries so that the insertion loss of the circuit is very small (less than 0.1db at 300Hz). Most of the loss in the transmission bridge is then caused by the transformer or capacitors. FIGS. 7 and 8 respectively show the insertion loss of transformer and capacitor bridges using the present current feed circuit compared with the insertion loss in conventional transmission bridge circuits. In FIG. 7 curve A represents the insertion loss of a transformer transmission bridge having the present electronic current feed circuit and curve B represents the insertion loss of a conventional transmission bridge whilst in FIG. 8 curve C represents the insertion loss of a capacitor transmission bridge having the present electronic current feed circuit and curve D represents the insertion loss of a conventional capacitor transmission bridge.

The use of an electronic current feed circuit enables other features to be provided which will now be referred to. The circuit has protection for short circuit fault conditions. The resistance of a telephone can reduce to as low as 50Ω so it is difficult to design a circuit which will cut off under short circuit fault conditions but not affect the operation of a telephone on a very short line. D.C. fault protection therefore has been limited to protecting against fault conditions applying an earth to terminal 60B or −V volts to terminal 60A. The operation of the protection elements in the present circuit can be seen by considering a situation when a variable resistance is connected between for example terminal 60B and earth. When this resistance decreases the current increases until it is limited by the diode 81 becoming conductive. As the resistance decreases still further the current remains almost constant but the voltages across the transistor 54B increases until the diode 88 becomes conductive. When the diode 88 conducts it pulls the inverting input of the operational amplifier 50B positive so that the amplifier causes the transistor 54B to become non-conductive. This renders the circuit inoperative. As soon as the fault is removed the circuit will automatically become operational again. The protection on the other part of the circuit operates in a similar manner if a −V volts battery fault occurs.

Protection against lightning strikes and induced voltage surges is provided by the zener diodes 85 and 86. Any of a number of suitable zener diodes can be used depending upon the surge rating required.

In applications where line current is fed from a supervisory unit via reed relay crosspoints, it is necessary to ensure that the reeds do not actually switch the line current. This can be done by providing heavy duty contacts to switch the line currents after the reed relay crosspoints have been operated. However with an electronic current feed circuit it is possible to switch off the current electronically while the crosspoints are being operated. The electronic switch is provided by the transistor 108 and is controlled by voltages applied to terminal 110.

Figure 9:
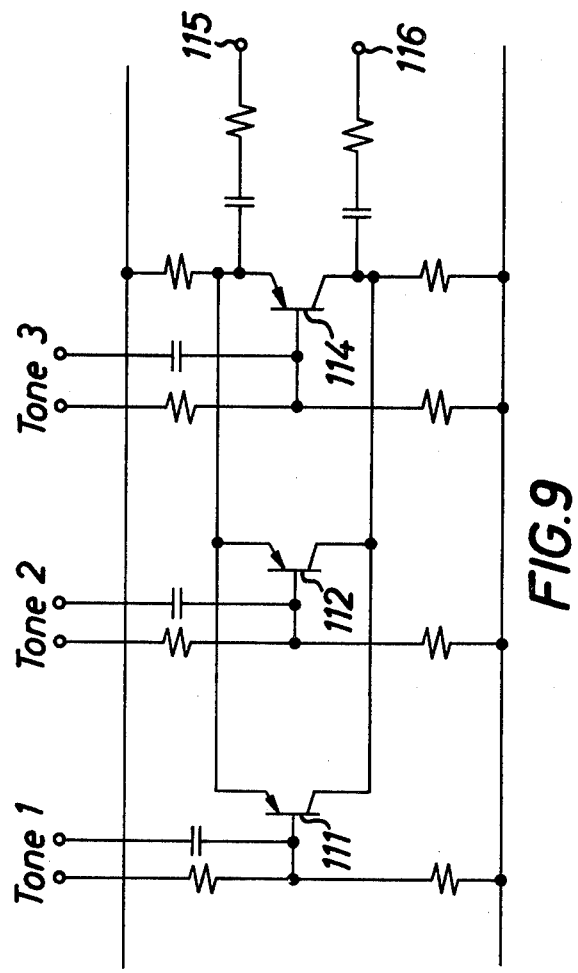
FIG. 9 is a circuit diagram of a circuit for feeding tone signals to the circuit of FIG. 6.

In conventional transmission bridges tones are usually sent to line from a third winding on the transformer or from an extra relay coil. However with an electronic current feed circuit it is possible to send tones directly to the line from the circuit. The tones are fed to the circuit via a transistor which acts as a switch controlled by external voltages and also as a phase splitter to provide a balanced signal. A number of tones can be provided by using one transistor for each tone and switching these in when required. Such a circuit is illustrated in FIG. 9. This circuit has three transistor switches 111, 112, 114 and the tone signals appear at terminals 115, 116. These terminals are connected to the points 115A and 116A on the circuit of FIG. 6.

Figure 10:
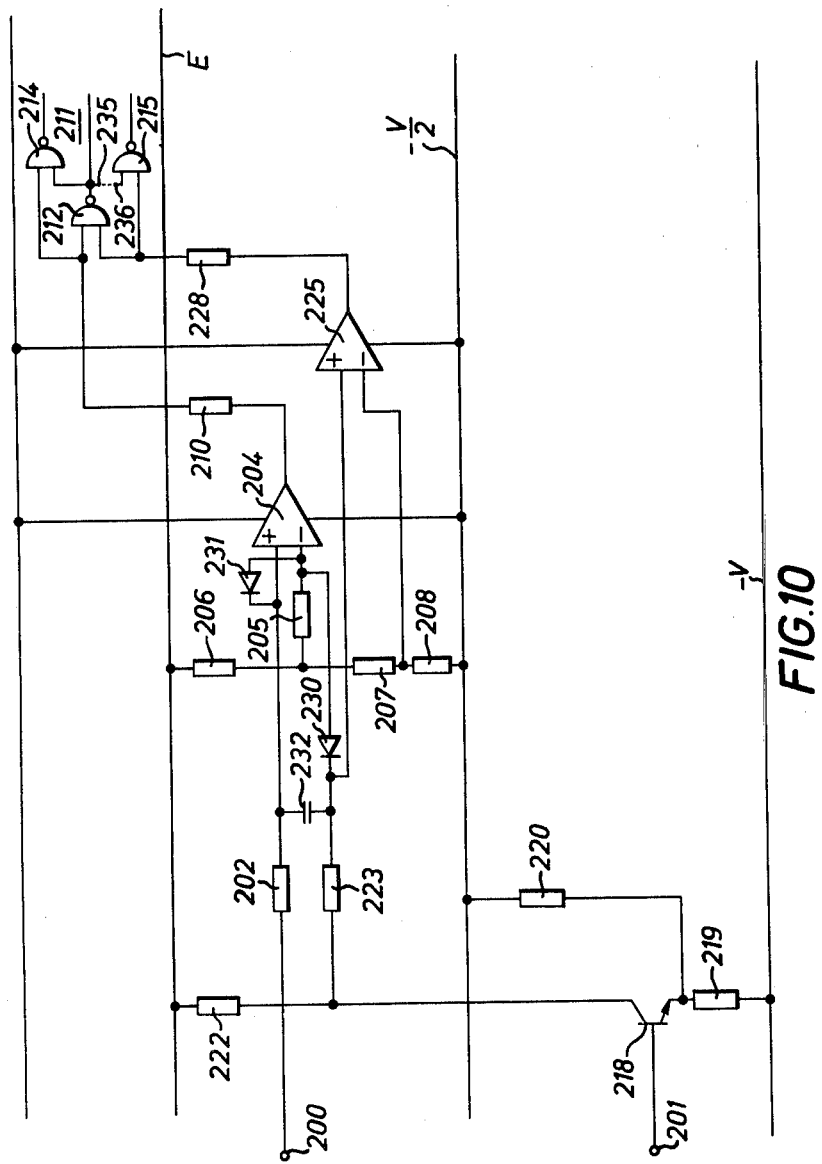
FIG. 10 is a circuit diagram of one form of d.c. signal detector circuit in accordance with the present invention.

Turning now to FIG. 10 a signal detector for use with the current feed circit of FIG. 6 has two input terminals 200 and 201. The signal detector can detect loop/disconnect pulses for dialling, 5KΩ loops to indicate pulses from coin boxes, and earth loops. The terminal 200 is connected to the point 119 of the circuit of FIG. 6 and the terminal 201 is connected to the point 120 of FIG. 6. The terminal 200 is connected by a resistor 202 to the non-inverting input of an operational amplifier 204. The amplifier 204 is connected so that it operates as a comparator, the reference signal for the comparator being supplied to the inverting input which is connected by a resistor 205 to the junction of resistors 206 and 207. The resistors 206 and 207 are connected in series with a further resistor 208 between earth line E and supply line −V/2. The output of the comparator 204 is connected by a resistor 210 to one input of a NAND gate 212. The NAND gate 212 forms part of a decoding arrangement consisting of NAND gates 212, 214 and 215.

The terminal 201 is connected to the base of a transistor 218. The emitter of the transistor 218 is connected by a resistor 219 to supply line −V and by a resistor 220 to supply line −V/2. The collector of the transistor 218 is connected to earth line E by a resistor 222 and by a resistor 223 to the non-inverting input of an operational amplifier 225. The operational amplifier 225 is connected as a comparator in a similar manner to the operational amplifier 204, the reference signal for the comparator 225 being supplied to the inverting input which is connected to the junction of the resistors 207 and 208. The output of the comparator 225 is connected by a resistor 228 to a second input of the NAND gate 212.

A diode 230 is connected between the resistor 223 and the inverting input of the amplifier 204. A further diode 231 is connected between the inverting and non-inverting inputs of the amplifier 204. A capacitor 232 is connected between the resistors 202 and 223.

In the decoding arrangement 211 one input of the NAND gate 214 is connected to receive the output of the amplifier 204 whilst the other input receives the output of the NAND gate 212. One input of the NAND gate 215 is connected to receive the output from the amplifier 225 whilst the other input is either connected to the one input or is connected to the output of the NAND gate 212 by connecting the points 235 and 236.

The outputs of the NAND gates 212, 214 and 215 are connected to a suitable processor (not shown) which decodes the state of the line. This can for example be a micro-processor.

The detector circuit shown in FIG. 10 can detect changes in line current since the inputs to the detector at terminals 200 and 201 are dependent on the current flowing in the two resistors 57A and 57B of FIG. 6. The components of the detector circuit are so arranged that the comparator 204 changes state when a loop resistance of less than 8KΩ exists and the comparator 225 changes state when a loop resistance of less than 3KΩ exists.

Consider initially the case where no loop is in existence. There is no line current and hence the resistance of the loop appears as greater than 8KΩ. In this condition the output from each of the comparators 204 and 225 is positive. Thus both inputs to the NAND gate 212 are high so that its output is low. This means that one input to the NAND gate 214 is high and one input is low so that its output is high and, if points 235 and 236 are connected, one input to the gates 215 is high and one is low so its output is high. This combination of signals is interpreted by the processor as indicative of no loop.

If a full loop is established in the telephone circuit the resistance of the loop is usually between 500 and 1000Ω. In this situation the potential at the inverting input of each of the comparators 204 and 225 goes negative relative to the reference potential and the output of both the comparators 204 and 225 becomes negative. This means that both inputs to the NAND gate 212 are low. Accordingly its output is high and so is the output of each of the NAND gates 214 and 215 since they each receive a high and a low input. This condition is interpreted by the processor as indicative of a full loop in the telephone circuit.

Considering the case of a coin operated telephone when a coin is inserted the resistance of a loop momentarily appears as 5KΩ. In this condition the output of the comparator 204 is negative whilst the output of the comparator 225 is positive. This means that one input to the NAND gate 212 is high and one input is low. Thus the output of the NAND gate 212 is high. The output of the NAND gate 214 is high since it receives a high and a low output and if the points 235 and 236 are connected the output of the NAND gate 215 is low since it receives two high inputs. The processor interprets this condition as a coin pulse.

The circuit of FIG. 10 can also be used as an earth loop detector. When an earth is applied to the loop the current increases in the negative side and decreases in the positive side. The comparator 225 which receives its input from the negative side has an ouput signal which is negative and indicative of a loop resistor of less than 3KΩ. The comparator 204 takes its input from the positive side and hence has an output which is positive and therefore indicative of a loop resistance of greater than 8KΩ. This is a situation which obviously cannot occur but it is decoded by the decoder 211 and the processor as meaning that there is an earthed loop. In this condition one input to the NAND gate 212 is high and one input is low so its output is high. The output of the NAND gate 214 is low as it receives two high inputs and the output of the NAND gate 215 is low as it receives one high and one low input.

The arrangement of diodes 230 and 231 is provided so that switching of the comparator 204 occurs with only a small difference in currents.

The detector can be used for caller identification on a party line. With no loop applied, the earth detector circuit will only operate for an earth applied to the negative side so the line reversal relay has to be used to discriminate between two subscribers.

The circuit described above is capable of longitudinal noise rejection. The inputs at 200 and 201 are isolated from the speech signals by the simulated inductances of the circuit of FIG. 6. However, the lines are subject to longitudinal or common mode interference which could affect the operation of the detectors. The resulting voltages at the inputs 200 and 201 are in phase. However, the inverting in effect of the transistor 218 produces signals in antiphase and these are cancelled using a resistive adding circuit consisting of resistors 202 and 223. The capacitor 232 provides an a.c. short circuit to cancel the noise signals whilst enabling the differences in d.c. level to be monitored for each signal detection.

It will be appreciated that the outputs of the comparators 204 and 225 could be fed directly to a processor to decode the state of the line. However, programming is simplified with the logic circuit 211. If the inputs of the NAND gate 215 are connected the output from the NAND gate 215 can be used to indicate loop resistances greater than 3KΩ and this can be used to detect dial pulses with low pulse distortion.

Figure 11:
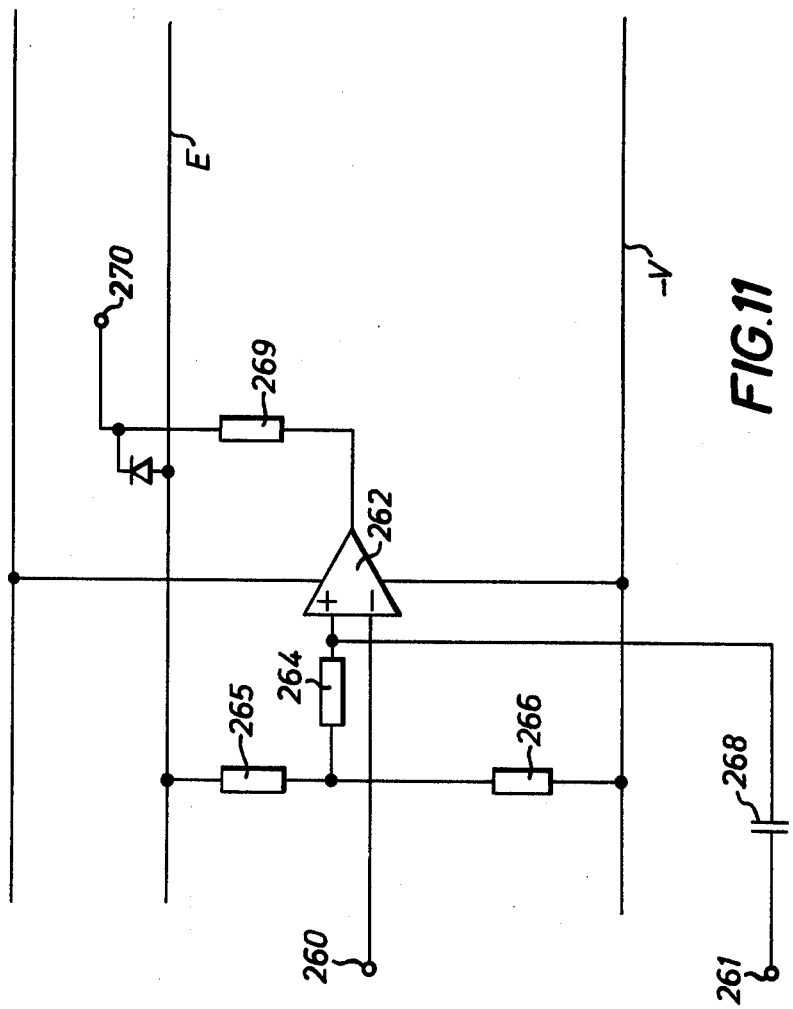
FIG. 11 is a circuit diagram of another form of d.c. signal detector circuit in accordance with the present invention.

In certain applications only loop detection is required. An example of a simple loop detector is shown in FIG. 11. This circuit has inputs 260 and 261. The input 260 is connected to the point 119 of FIG. 6 and the input 261 is connected to the emitter of the transistor 54B. The input 260 is connected to the inverting input of an operational amplifier 262. The operational amplifier is connected as a comparator in a similar manner to the comparators 204 and 225 of FIG. 10. A reference potential is applied to the inverting input of the comparator this input being connected by a resistor 264 to the junction of two resistors 265 and 266 which are connected in series between earth line E and supply line −V. The terminal 261 is connected by a capacitor 268 to the inverting input of the comparator 262. The output of the comparator 262 is connected by a resistor 269 to an output terminal 270. The output terminal 270 is connected to a processor in the same manner as the output of the decoder 211 of FIG. 10. The comparator 262 is arranged to switch states when a loop is established in a telephone circuit and this change of state is sensed by a processor connected to the terminal 270. The connection from the terminal 261 to the inverting input is provided to counteract the effect of longitudinal common mode signals. Since the signals appear at both terminals 260 and 261 they are applied to both inputs of the comparator and therefore should cancel each other out. Any change in the signal applied to the non-inverting signal is counteracted by corresponding change in the reference potential applied to the inverting input.

We claim:

1. In combination with a telephone exchange having an electronic current feed circuit which includes a pair of electronic circuit elements each of which has one terminal for connection to a respective one of a pair of telephone lines and another terminal for connection to one terminal of an electrical power supply, each electronic circuit element being a simulated inductance and providing a resistive path for d.c. current from said power supply to a subscriber's telephone, a d.c. detector comprising: a level detector having a first input connected to a point from which it can detect current flowing in said resistive path and a second input for connection to a reference signal, said level detector having two states and being arranged to change state when the signal at its first input is indicative of the telephone line having a predetermined reference level, the output signal of the level detector being indicative of the state of the line, said reference signal being so selected that the detector detects the establishment of a loop in the telephone circuit.

2. A d.c. detector circuit as claimed in claim 1, wherein said level detector is an operational amplifier connected as a comparator.

3. A d.c. signal detector circuit as claimed in claim 1, including two level detectors, the first detector having a first input which is arranged to be connected to a first point in said resistive path from which it can detect current flowing from one of a pair of telephone lines and a second input which is arranged to have a reference signal applied thereto, the second detector having a first input which is arranged to be connected to a second point in said resistive path from which it can detect current flowing in the other of said pair of lines and a second input which is arranged to have a reference signal applied thereto, each level detector having two states and being arranged to change state when the signal at its first input is indicative of the telephone line having a respective one of two predetermined resistances, the output signals of the level detectors together being indicative of the state of the line, and sensing means responsive to said output signals to sense establishment of a loop, coin pulses and earth signals.

4. A d.c. detector circuit as claimed in claim 3, wherein each level detector is an operational amplifier connected as a comparator.

5. A d.c. detector circuit as claimed in claim 4, including a transistor which acts as an inverter connecting the first input of the second detector to said second point.

6. A d.c. detector circuit as claimed in claim 3, wherein said sensing means includes a decoding arrangement connected to the outputs of the level detectors.

7. A d.c. detector circuit as claimed in claim 6, wherein said decoding arrangement comprises three NAND gates.

8. A d.c. detector circuit as claimed in claim 3, including a diode connected between the first input of the second comparator and the second input of the first comparator, and a further diode connected between the second input of the first comparator and the first input thereof.

9. A d.c. detector circuit as claimed in claim 8 including a resistor and capacitor network connected in the input circuits of the comparators to reduce common mode interference.

* * * * *